Oct. 15, 1968

E. SAARINEN ET AL
VALVE RETAINING MEANS FOR VARIABLE
COMPRESSION RATIO PISTONS 3,405,698

Filed Dec. 8, 1967

INVENTORS
EDWARD SAARINEN
JOHN BASILETTI

BY Hauke, Krass, & Gifford

ATTORNEYS

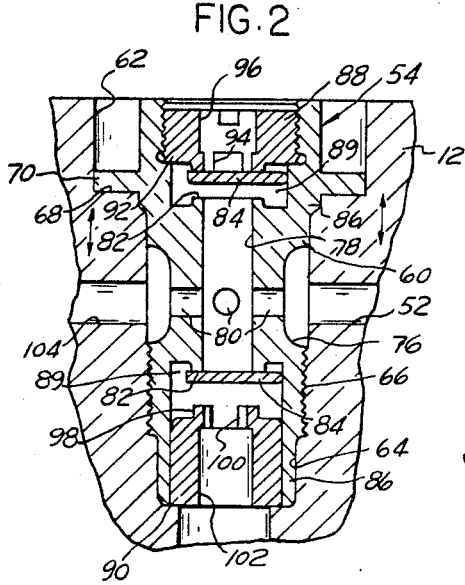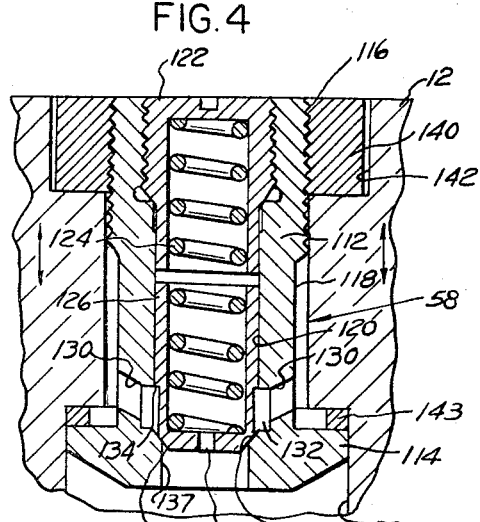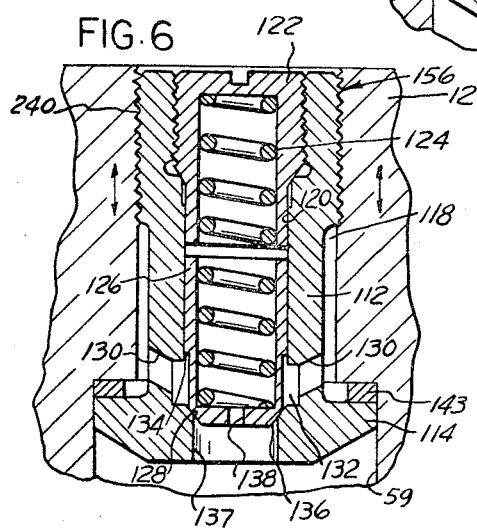

United States Patent Office 3,405,698
Patented Oct. 15, 1968

3,405,698
VALVE RETAINING MEANS FOR VARIABLE COMPRESSION RATIO PISTONS
Edward Saarinen, Detroit, and John Basiletti, Royal Oak, Mich., assignors to Continental Aviation & Engineering Corporation, Detroit, Mich., a corporation of Virginia
Filed Dec. 8, 1967, Ser. No. 689,203
9 Claims. (Cl. 123—78)

ABSTRACT OF THE DISCLOSURE

A two-part variable compression ratio piston assembly having an inner and an outer member movable relative to one another and chambers which expand and contract with movement of the members. The relative movement of the members and thus the compression ratio of the engine is controlled by regulating the flow of a hydraulic fluid such as engine lubrication oil to and from these chambers. The hydraulic system includes a supply valve assembly and a discharge valve assembly each constructed to utilize the heat generated in the vicinity of the combustion chamber to aid in retaining the assemblies in place.

Background of the invention

The present invention relates to variable compression ratio (VCR) piston assemblies such as those disclosed in prior U.S. Patents Nos. 3,156,162, 3,161,112, 3,185,137, 3,185,138, 3,303,831, and 3,311,096. In the disclosures of these patents an inner piston member or carrier is connected in the usual manner to a connecting rod and an outer piston member or shell is carried by and is movable axially relative to the inner member. Relative movement of these members varies the compression ratio of the particular cylinder in which the piston moves. Clearance spaces are provided between the top and bottom ends of the inner and outer members and these form upper and lower chambers which vary conversely in volume in relation to the relative movement of the members to gradually increase the compression ratio until a predetermined combustion chamber has been achieved. The hydraulic system then varies the movement of the members in a manner which tends to maintain a uniform maximum combustion chamber pressure.

Many of the problems which have heretofore arisen with respect to the construction of a practical VCR engine have been associated with the valve assemblies which regulate flow of the lubrication oil to and from the chambers. One of these problems which has not heretofore been satisfactorily solved has been caused by the high heat generated in the upper portions of the piston and the effects of this heat on retaining the valves in place in these areas. Generally the valve parts are constructed of stainless steel or similar material and the other parts of the piston are constructed of aluminum. This necessary difference in materials aggravates the problem because of the great differences in the coefficients of thermal expansion between these assemblies and also because of the differences in strength between the materials. Previous attempts to retain the valve assemblies within the piston members by threaded connections have not been successful by reason of these differences.

Summary of the invention

The present invention provides a new construction for both the discharge valve assembly and the supply valve assembly. The construction utilizes the differences in the coefficients of thermal expansion between the material used for the valve parts and the inner member as a means for utilizing increased heat to more securely lock the valve assemblies in place.

Description of the drawings

Several preferred embodiments of the present invention are more clearly described in the following description. The description makes reference to the following drawings in which like reference characters refer to like parts throughout the several views and in which, FIG. 2 is an enlarged fragmentary cross-sectional view illustrating in greater clarity the supply valve assembly shown in FIG. 1, FIG. 4 is an enlarged fragmentary cross-sectional view illustrating in greater clarity the discharge valve assembly shown in FIG. 1, FIG. 6 is a view similar to FIG. 4 but illustrating yet another preferred discharge valve assembly of the present invention.

Description of preferred embodiments

Figure 1:
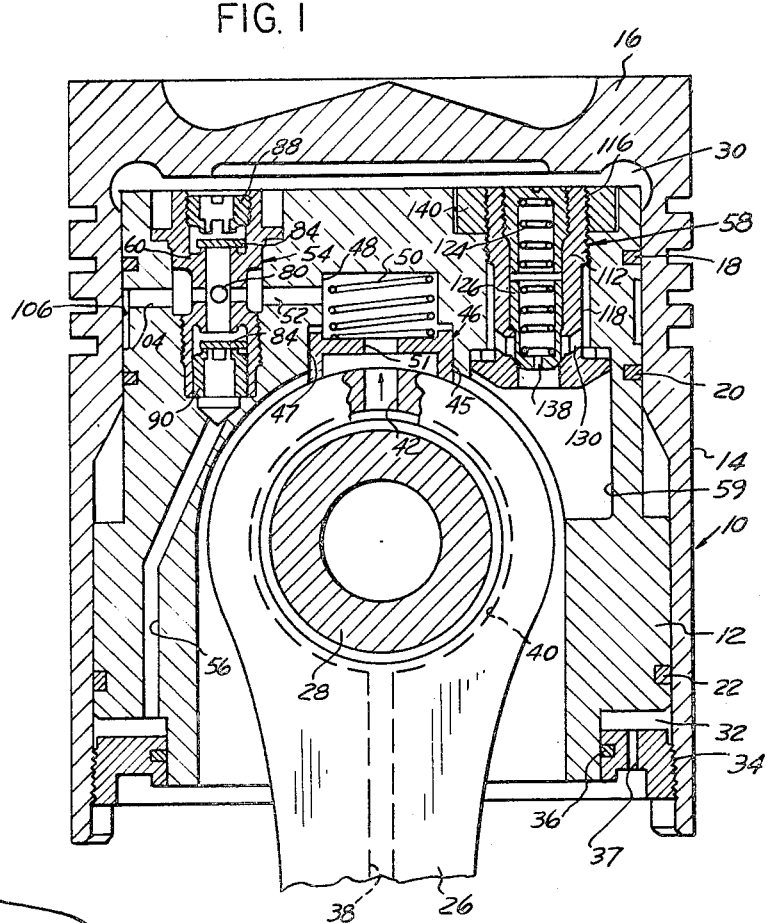
FIG. 1 is a longitudinal cross-sectional view of a piston assembly embodying the present invention.

Now referring to the drawings for a more detailed description of the present invention, a preferred variable compression ratio (VCR) piston 10 is illustrated in FIG. 1 as comprising an inner member or piston carrier 12 carrying on its outer surface an outer member or shell 14. The outer member 14 has a crown 16 which serves as the head of the piston 10 and which forms a movable wall of the lower boundary of the combustion chamber of the engine. Inner member 12 is linked to the crankshaft (not shown) of the engine by a connecting rod 26 and a wrist pin 28 in the conventional manner.

Thus, the inner member 12 is movable axially between fixed upper and lower limits in the manner of a conventional piston while the outer member 14 can move axially upwardly and downwardly relative to the inner member 12 within limits which will be presently described. An upper variable volume chamber 30 is formed intermediate the upper surface of the inner member 12 and the lower surface of the crown 16. A lower variable volume chamber 32 is formed intermediate the lower surface formed by an annular recess at the lower end of the inner member 12 and by the upper surface of a ring 34 fixed to the outer member 14. A sealing ring 36 prevents fluid leakage from the lower chamber 32 intermediate the adjacent surfaces of the inner member 12 and the ring 34. A restricted orifice 37 of a fixed diameter is formed in the ring 34 and provides communication between the chamber 32 and the crankcase of the engine.

The movement of the outer member 14 relative to the inner member 12 is limited by the ring 34 and the lower surface of the crown 16 but relative movement within these limits varies the clearance volume of the cylinder and thus the compression ratio of the engine. By controlling this relative movement the compression ratio of the engine can be controlled and in the present disclosure this achieved by regulating the flow of an incompressible fluid into and out of the chambers 30 and 32. The control fluid preferably comprises oil supplied to the piston 10 from the usual pressurized lubricating oil supply of the engine by an oil passage 38 in the connecting rod 26. The passage 38 preferably connects with an annular groove 40 encircling the piston pin 28, and leading to an outlet 42. A slipper collector assembly, generally indicated at 46, comprises a cap 45 disposed in a cavity 47 and urged by a spring 50 into sliding engagement with the connecting rod 26. The cap 45 collects the oil discharging from outlet 42 and directs it through an opening 51 to a cavity 48 formed in the inner member 14.

Oil is fed from cavity 48 to the chambers 30 and 32 by way of a passage 52 connected with the chamber 48 and connecting to the upper chamber 30 and the lower chamber 32 through a supply valve assembly generally indicated at 54. A passage 56 formed in the inner member 12 communicates the lower end of the valve assembly 54 with the lower chamber 32.

Oil is discharged from the upper chamber 30 to crankcase atmosphere by way of a pressure regulating discharge valve assembly 58 disposed within a drainage passage 59 and operable to open when oil pressure in the upper chamber 30 exceeds a predetermined value.

The supply valve assembly 54, as can best be seen in FIG. 2, preferably comprises a substantially cylindrical port member 60 mounted in a bore 62 and a counterbore 64 formed in the inner member 12. A lower section 66 of the member 60 is externally threaded as shown to be received in corresponding threads formed along a portion at the lower end of the bore 64. The juncture between the bore 62 and the counterbore 64 forms an annular, horizontal shoulder 68 upon which is seated an outwardly extending annular flange portion 70 spaced from the upper end of the port member 60. The member 60 is installed in the inner member 12 by turning the lower section 66 into the threaded portion of the bore 64 until the annular flange portion 70 rests tightly against the annular shoulder 68.

The port member 60 is provided with an external annular groove 76 which registers with the passage 52 and communicates with an axial passage 78 formed in the port member 60 by way of a plurality of annularly spaced ports 80. Valve seats 82 are formed at each end of the through passage 78 and are adapted to be engaged by valve plates 84. The ends of the port member 60 are formed with extended cylindrical portions 86 which provide the means for mounting an upper stop member 88 and a lower stop member 90. The upper stop member 88 is provided with a downwardly extending cylindrical portion 92 having a plurality of arcuately removed sections 94 and encompassing an axial passage 96 so that when the valve plate 84 is in the position shown in FIG. 2 fluid flow from the axial passage 78 around the valve plate 84 and through the removed sections 94 and the passage 96 to the upper chamber 30 is permitted.

Similarly, the lower stop 90 is formed with an upstanding cylindrical section 98 having arcuately removed sections 100 and encompassing an axial passage 102 which registers with the passage 56 to the lower chamber 32. The lower stop member 90 is retained in position by engagement with the inner member 12 at the lower end of the bore 64.

The stop members 88 and 90 are spaced from the valve seats 87 so that the extended portions 86 form chambers 89 providing an area for the valve plates 84 to move freely between the position closing the through passage 78 and a position engaging stops 88 and 90 and thus operating fluid flow from that end of the port member 60.

The groove 76 also registers with a passage 104 formed in the inner member 12 and which as can best be seen in FIG. 1 communicates with a cooling chamber 106 formed intermediate the inner member 12 and the outer member 14.

Figure 3:
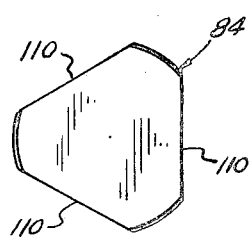
FIG. 3 is a plan view of one of the valve plates of the supply valve assembly shown in FIG. 2.

As can best be seen in FIG. 3, the valve plates 84 are in the form of flat circular discs provided with chordially removed portions 110 so that they assume a substantially triangular shape in plan. This shape is preferred to aid in centering the plates while permitting oil flow past the periphery of the plates.

As can best be seen in FIG. 4, the pressure regulating discharge assembly 58 preferably comprises a casing 112 having a lower radially outwardly extending flange portion 114 and an upper externally threaded portion 116. An axially elongated annular groove 118 is formed intermediate the threaded portion 116 and the flange portion 114. The casing 112 is provided with an axial bore 120 threaded at its upper end to receive a spring seat member 122.

One end of a spring 124 seats in the seat member 122 while the opposite end seats within a valve member 126 and urges it against a valve seat 128 formed in the lower end of the casing 112.

The casing 112 is provided with a plurality of cross passages 130 registering with an annular groove 132 formed in the bore 120 adjacent the lower end of the valve member 126. The groove 132 registers with a shoulder 134 formed in the external surface of the valve member 126 so that upon a predetermined increase in pressure in the groove 132 the valve member 126 is moved upwardly against the force of the spring 124 moving a frusto-conical valve face 136 of the valve member 126 away from the valve seat 128 and to thereby open the groove 137 to the crankcase of the engine through an opening 132 in the lower end of the casing 112. An opening 138 in the lower end of the valve 126 equalizes pressure between the interior of the valve member 126 and the lower exterior end thereof.

Figure 5:
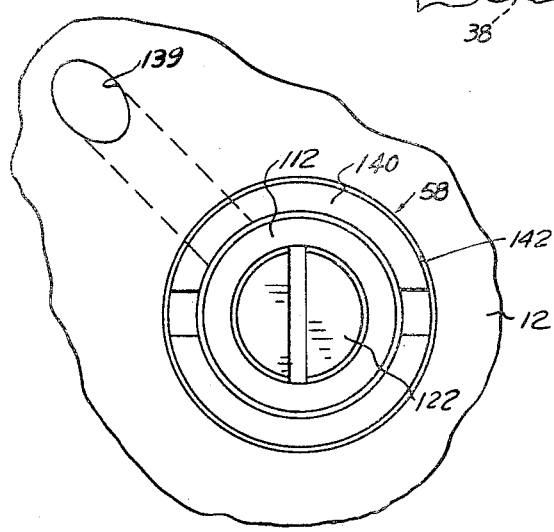
FIG. 5 is a top plan view of the assembly shown in FIG. 4.

As can best be seen in FIG. 5 the inner member 12 is provided with an angular bore 139 which communicates the upper chamber 30 with the recess 118 so that fluid pressure in the chamber 30 is transmitted to the groove 132 to activate the valve member 126 when pressure in chamber 30 exceeds a predetermined value.

The valve assembly 58 is held in place in the inner member 12 by means of the flange portion 114 and a nut 140 received by the threaded upper surface 116 of the casing 112 and seated in a suitable recess 142 formed in the inner member 12. A seal 143 is provided intermediate the flange 114 and the adjacent surface of the inner member 112.

FIG. 6 illustrates another preferred valve assembly 156 which is substantially similar to the valve assembly 58 described above but which is threaded directly into a threaded portion 240 of the inner member 12 instead of into the nut 140.

As the invention has thus far been described and assuming that combustion chamber pressure is below the predetermined maximum value which the VCR piston 10 is designed to maintain and that the upper and lower chambers 30 and 32 are both filled with oil, during the latter part of each upward stroke of the piston 10 at the end of the exhaust stroke and the early part of each downward intake stroke the momentum of the outer member 14 tends to move it upwardly relative to inner member 12 thereby tending to expand upper chamber 30 and contract lower chamber 32. The resulting increase in oil pressure in lower chamber 32 as well as the inertial forces acting on the valve plates 84 will cause the lower valve plate 84 of the supply valve assembly 54 to move upwardly against the lower valve seat 82 to the position shown in FIG. 2 to close oil flow from the passage 52 to the lower chamber 32. This will produce a hydraulic lock between the members 12 and 14 by reason of the oil contained within the lower chamber 32 with the result that during each cycle of engine operation upward relative movement of the outer member 14 with respect to the inner member 12 will be slight and only to the degree permitted by the escape of oil from the lower chamber 32 by way of the orifice 37. Similarly, the tendency of the upper chamber 30 to expand during this position in the piston operation and the effects of inertial forces on the valve plates 84 will cause the upper valve plate 84 of the supply valve assembly 54 to move to the upper position shown in FIG. 2 against the stop member 88 to open oil flow from the passage 52 to the upper chamber 30.

The controlled discharge from the lower chamber 32 through the restricted orifice 37 then permits a gradual cyclic decrease in the volume of the lower chamber 32 and thus a corresponding increase in the volume of the upper chamber 30 to provide relative upward movement between the outer member 14 and the inner member 12. As the upper chamber 30 increases in volume, oil from the lubrication system is directed through the supply valve assembly 54 into the upper chamber 30 to maintain that chamber in a filled condition.

During the compression and power stroke, the gas pressure acting on piston crown 16 is transmitted to the inner member 12 through the oil in the upper chamber 30 creating a high oil pressure in this chamber. Whenever the gas pressure exceeds the selected upper limit, sufficient oil pressure is built up in the upper chamber 30 to open the discharge valve assembly 58 and release some of the oil from the chamber 30 allowing the outer member 14 to move downwardly relative to the inner member 12 and thus decreasing the compression ratio of the engine. The downward relative movement of the outer member 14 enlarges chamber 32 and the lower valve plate 84 of the supply valve assembly 54 is moved to the position shown in FIG. 1 against the lower stop member 90 to open the lower chamber 32 to passage 52 and then oil enters the lower chamber 32 to keep it fully charged. In this situation the increased pressure in the upper chamber 30 causes the upper valve plate 84 to move to the position shown in FIG. 1 to close oil flow from the valve assembly 54 to the upper chamber 30.

The amount of oil discharged from the upper chamber 30 during any compression stroke depends upon the margin by which the cylinder gas pressure exceeds that necessary to cause the discharge valve assembly 58 to open and the duration of this excess pressure. The valve spring setting and the magnitude of duration of the excess gas pressure determines the downward movement of outer member 14 relative to inner member 12. The upward relative movement, on the other hand, is the same on each exhaust and induction stroke and is determined by the size of the fixed orifice 37. If the upward and downward relative movements are equal as is the case when the engine is running under constant load the compression ratio will remain unchanged. If the load is increased, the downward movements will exceed the upward movements lowering the compression ratio until an equilibrium has been established. Conversely, if the load is reduced, the compression ratio will increase to a new point of equilibrium.

The advantages of the supply valve assembly 54 and the discharge valve assemblies 58 and 156 of the present invention over similar means in the aforementioned patents reside in the construction of the valve assemblies and the particular manner of retaining the assemblies within the inner member 12. Heretofore, retention of these assemblies in the inner member provided a problem. Because of the differences in thermal expansion between the materials used to construct the assemblies and that used for the member 12 and the high heat generated in the inner member 12, especially in the upper portions thereof adjacent the combustion chamber of the engine, the valve components, if fastened by conventional means such as by threads or snap rings, would tend to become loose in the inner member 12 as the aluminum of the inner member 12 expanded more rapidly than the stainless steel parts of the valve members. Further, where a threaded mount has been used, the aluminum ordinarily used to produce the piston parts such as inner member 12, would tend to distort under high heat and produce difficulty in removing the valve if replacement were necessary.

In the present construction of the supply valve assembly 54 the threaded portion 66 is formed in the lower portion of the port member 60 away from the high heat generated in the upper portions of the piston by the combustion chamber. The valve assembly 54 is maintained in position by turning the port member 60 into the threaded portion to bring the annular portion 70 into secure engagement against the shoulder 68. Then by constructing the port member 60 and other valve components from a material such as stainless steel the differences in the rate of thermal expansion between the aluminum used to form the inner member 12 and the stainless steel used for the valve assembly 54 can be utilized to produce a secure retention of the valve assembly 54 in place as the engine heats up. As the engine heats up the aluminum of the inner member 12 will expand much more rapidly than that of the stainless steel seat member 60 so that a relative expansion will occur in the direction of the arrows shown in FIG. 2. This will produce a secure enengagement between the shoulder 68 and the flange 70 at the upper end to lock the valve assembly 54 in place.

Similarly the discharge valve assemblies 58 and 156 of FIGS. 4–6 respectively are provided with similar functioning retaining means. In the assembly 58 as illustrated in FIGS. 4 and 5 the casing 112 is inserted through the bottom of the inner member 12 to bring the threaded portion 116 up into the recess 142 formed in the top of the inner member 12 and the nut 140 is threaded over the threaded portion 116 of the casing 112 to bring the lower annular flange 114 up against the underside of the inner member 12 and securely lock the assembly 58 in place. As the engine heats up the aluminum of the inner member 112 will expand more rapidly than the stainless steel assembly 58 and a relative expansion will be produced in the direction of the arrows to bring the shoulder forming the recess 142 up into tight engagement with the nut 140 so that the valve assembly 58 will be securely locked between the nut 140 and the flange portion 114.

In the embodiment of FIG. 6 the relative expansion between the aluminum portion forming the body member 12 and the casing 112 of the valve assembly 156 will produce stresses in the direction of the arrows to expand the inner member 12 to securely lock the valve assembly 156 in place between the threaded portion 240 and the flange 114. The embodiment of FIG. 6 is the less desirable construction for the discharge valve assembly of the two embodiments shown for the reason that it requires threads to be formed in the aluminum inner member 12 in an area subjected to fairly intense heat and therefore this embodiment suffers from some of the disadvantages heretofore indicated in that this threaded portion is subject to some distortion and thus produces difficulty in removing the valve assembly from place if it has to be replaced.

It is apparent then that although we have described several embodiments of our invention, many other changes and modifications can be made therein without departing from the spirit of the invention or the scope of the appended claims.

Having thus described our invention we claim:

1. In an internal combustion engine, a piston and a hydraulic system connected with said piston, said hydraulic system including a valve member constructed of a material having a different rate of thermal expansion than the material used to form said piston, and means for retaining said valve member in place within said piston including means utilizing the differences in thermal expansion of said materials to produce a secure engagement between said piston and said valve member upon the engine being heated up.

2. The combination as defined in claim 1 and in which said valve member includes an elongated casing, said retaining means includes means securing said valve casing to said piston in two separated areas along said casing, and said casing being constructed of a material having a lower rate of thermal expansion than the material forming said piston whereby as said engine heats up said piston expands more rapidly than said casing to produce stresses tending to separate said two areas and thus to lock said valve member more securely in place.

3. In an internal combustion engine, a piston having first and second members movable relative to one another in response to reciprocation of the piston with respect to the combustion chamber of the engine, a first and second chamber formed within said piston and varying oppositely in volume in response to movement of said first member relative to said second member and means for supplying and discharging fluid to and from said chambers comprising a supply valve assembly having one end communicating with said first chamber, an opopsite end communciating with said second chamber and means registering said valve assembly with a pressure fluid source, said supply valve assembly being constructed of a material having a different rate of thermal expansion than said piston and means for retaining said valve member in place within said piston including means utilizing the differences in thermal expansion of said valve assembly and said piston to produce a secure engagement between said members upon the engine being heated up.

4. The combination as defined in claim 3, and including a discharge valve assembly connected with one of said chambers and operable to open a discharge passage therefrom upon a predetermined pressure being produced within said chamber, said discharge valve assembly being constructed of a material having a different rate of thermal expansion than said piston, and means retaining said discharge valve assembly within said piston including means utilizing the differences in the rate of thermal expansion of said valve assembly and said piston to securely lock said discharge valve assembly in place upon said engine heating up.

5. The combination as defined in claim 3, and in which said piston is constructed of a material having a higher rate of thermal expansion than the material of said valve assembly.

6. In an internal combustion engine, a piston having first and second members movable relative to one another in response to reciprocation of the piston with respect to the combustion chamber of the engine, a first and second chamber formed within said piston and varying oppositely in volume in response to movement of said first member relative to said second member and means for discharging fluid from said chambers, said last mentioned means including a pressure regulator discharge valve assembly connected with one of said chambers and operable to open a discharge path from said chamber upon a predetermined pressure increase within said chamber, means for retaining said discharge valve assembly within said piston, said discharge valve assembly being constructed of a material having a different rate of thermal expansion than the material forming said piston and said retaining means including means utilizing said differences in the rate of thermal expansion to securely lock said discharge valve assembly to said piston upon engine being heated.

7. In a variable compression ratio piston for an internal combustion engine having an inner member adapted for connection by a wrist pin to a connecting rod of the engine and an outer member carried on and movable axially relative to the inner member so that the crown of the outer member forms a variable boundary of the piston in the combustion chamber of the engine in which the piston reciprocates to thereby vary the clearance volume by movement of the crown relative to the wrist pin axis of the connecting rod, the combination therewith of a hydraulic system for said piston, said system comprising:
(a) a first chamber defined between said crown and an adjacent first surface of said inner member and a second chamber defined between a second surface of said inner member and an adjacent surface of said outer member, said first and second chambers varying oppositely in volume in response to said movement of said outer member relative to said inner member and,
(b) means regulating the flow of a hydraulic fluid to and from said last mentioned means including a supply valve assembly disposed within said inner member and means connecting said supply valve assembly with a source of hydraulic fluid,
(c) said supply valve assembly comprising a port member registering with said source and normally directing hydraulic fluid from said source to said chambers, valve members carried at each end of said port member and movable to positions closing fluid flow through the associated ends of said port member,
(d) said inner member being constructed of a material having a higher coefficient of thermal expansion than the material forming said port member, and means for retaining said port member within said inner member including a threaded connection formed between said members, a flange portion formed on said port member and engaging a shoulder formed in said inner member in an area spaced from said threaded connection whereby upon said piston becoming heated said inner member expands in a direction toward said flange portion of said port member to securely lock said shoulder against said flange portion.

8. The combination as defined in claim 7, and in which said means for regulating the flow of hydraulic fluid to and from said chambers includes a discharge valve assembly,
(a) said discharge valve assembly registering with said upper chamber and operable to open a discharge path from said upper chamber upon a predetermined pressure increase being produced in said upper chamber,
(b) said discharge valve assembly being constructed of a material having a lower rate of thermal expansion than said inner member, and means utilizing the differences in the rates of thermal expansion to retain said discharge valve assembly in place,
(c) said means comprising said discharge valve assembly having a lower annular flange portion adapted to seat against a complementarily formed portion of said inner member, a bore formed in said inner member for receiving a portion of said valve assembly above said flange portion, and means forming a threaded connection between said inner member and said valve assembly in an area spaced upwardly from said flange portion whereby upon said inner member becoming heated said inner member will expand to securely clamp said inner member between said threaded portion and said flange portion.

9. The combination as defined in claim 8, and in which said inner member is provided with a recess, and said threaded connection includes a nut member carried within said recess.

References Cited
UNITED STATES PATENTS

| | | | |
|---|---|---|---|
| 2,573,688 | 11/1951 | Butler | 123—78 |
| 2,573,689 | 11/1951 | Butler | 123—78 |
| 2,910,826 | 11/1959 | Mansfield | 123—48 |
| 3,156,162 | 11/1964 | Wallace et al. | 123—48 |
| 3,161,112 | 12/1964 | Wallace et al. | 123—48 |
| 3,185,137 | 5/1965 | Dreyer | 123—48 |
| 3,185,138 | 5/1965 | Druzynski | 123—48 |
| 3,303,831 | 2/1967 | Sherman | 123—78 |
| 3,311,096 | 3/1967 | Bachle et al. | 123—78 |

WENDELL E. BURNS, *Primary Examiner.*